United States Patent [19]
Burks et al.

[11] Patent Number: 5,166,272
[45] Date of Patent: Nov. 24, 1992

[54] EMULSION POLYMERS AND COATING COMPOSITIONS PREPARED THEREFROM

[75] Inventors: Steven J. Burks, Allison Park; Karl F. Schimmel, Verona; Suryya K. Das, Pittsburgh, all of Pa.; Mary E. Rosenberger, Bay Village, Ohio; James A. Claar, Mars, Pa.; Anthony C. Palermo; Henry H. Crum, III, both of Gibsonia, Pa.

[73] Assignee: PPG Industries, Inc., Pittsburgh, Pa.

[21] Appl. No.: 502,954

[22] Filed: Apr. 2, 1990

[51] Int. Cl.$^5$ .................. C08F 255/08; C08F 267/04; C04B 14/00
[52] U.S. Cl. .................................. 525/285; 525/260; 525/263; 525/264; 525/296; 525/309; 525/327.6; 106/400
[58] Field of Search ............... 525/285, 260, 264, 263, 525/296, 309, 327.6

[56] References Cited

U.S. PATENT DOCUMENTS 4,020,966  5/1977  Wszolek .

FOREIGN PATENT DOCUMENTS 50-55648   5/1975  Japan .
50-149777 12/1975  Japan .
53-96086   8/1978  Japan .

*Primary Examiner*—James J. Seidleck
*Assistant Examiner*—Vasu S. Jagannathan
*Attorney, Agent, or Firm*—Linda Pingitore

[57] ABSTRACT

A stable emulsion polymer is prepared by the emulsion polymerization of a vinyl monomer component in the presence of a base neutralized copolymer having a peak molecular weight not exceeding 50,000 of an olefinically unsaturated material selected from the group consisting of 1-decene, 1-dodecene, undecenylic acid and mixtures thereof and an ethylenically unsaturated anhydride containing material. The emulsion polymer is particularly useful for preparing coating compositions which have excellent physical properties.

20 Claims, No Drawings

EMULSION POLYMERS AND COATING COMPOSITIONS PREPARED THEREFROM

BACKGROUND OF THE INVENTION

The present invention relates to emulsion polymers and to coating compositions prepared therefrom.

In recent years there has been a trend toward the preparation of coating compositions from polymeric latexes for environmental reasons. Namely, coating compositions prepared from polymeric latexes do not have the solvent emissions problems associated with normal solvent based coating compositions. Polymeric latexes, however, generally require the presence of a low molecular weight emulsifier or surfactant in order to stabilize the latex particles. Unfortunately, the low molecular weight emulsifiers have been found to adversely affect several properties of coating compositions prepared from such latexes. Specifically, the low molecular weight emulsifiers adversely affect the water sensitivity and adhesion of the coatings and in addition lead to poor weather resistance and degradation by ultraviolet rays and foaming during preparation of the latex and application of the coating.

Another problem associated with emulsion polymers and which is exacerbated by the use of insufficient amounts of low molecular weight emulsifiers or surfactants is the formation of grit in the latex. Grit consists of large chunks of polymeric material which flocculate and settle out. One way in which to minimize or remove the presence of grit is by the addition of additional emulsifier or surfactant. However, as has been mentioned above, the low molecular weight emulsifier leads to other problems which detract from film properties. The grit is also deleterious to the appearance of the coating film because it leads to an undesirable textured appearance and also additional processing costs since in order to remove the grit, the latex must be filtered. Moreover, once the grit is filtered there is the additional cost of disposal since it is a polymeric waste product.

There is a need, therefore, for an emulsion polymer composition which is comparable to conventional materials heretofore available, and in addition which provides coatings having excellent water resistance and corrosion resistance, good adhesion to the substrate and especially outdoor weather resistance and durability.

SUMMARY OF THE INVENTION

In accordance with the present invention there is provided a stable emulsion polymer prepared by the emulsion polymerization of a vinyl monomer component in the presence of a base neutralized copolymer having a peak molecular weight not exceeding 50,000 of an olefinically unsaturated material selected from the group consisting of 1-decene, 1-dodecene, undecenylic acid and mixtures thereof and an ethylenically unsaturated anhydride containing material.

Also provided in accordance with the present invention are thermoplastic and thermosetting coating compositions prepared from the aforesaid emulsion polymer.

DETAILED DESCRIPTION OF THE INVENTION

In the preparation of the stable emulsion polymer of the present invention the base neutralized or partially base neutralized copolymer of an olefinically unsaturated material having at least 8 carbon atoms and an anhydride material serves as a surfactant or emulsifier or dispersant for a subsequent emulsion polymerization of the dispersed phase of a vinyl monomer component. The olefinically unsaturated material can be selected from a number of suitable materials although preferably it is a normal alpha-olefin. For the purposes of the present invention an olefinically unsaturated material includes aliphatic, cyclic, and alicyclic materials. Examples of suitable materials include 1-decene, 1-dodecene, undecenylic acid, 1-octene, vinyl cyclohexene, dipentene, 2,4,4-trimethyl-1-pentene and mixtures thereof.

It is especially important that the olefinically unsaturated material have at least 8 carbon atoms because latexes prepared from materials having less than 8 carbon atoms have been found to detrimentally affect the physical properties of coating compositions prepared with the latexes. Namely, the cured films exhibit poor film forming properties including adhesion and flexibility. Also the coating compositions exhibit foaming on application.

In one embodiment, the olefinically unsaturated material is a reactively functional normal alpha-olefin, for example a material having carboxyl functionality. One such material is undecenylic acid.

The anhydride containing material can also be selected from a variety of materials. Examples of suitable anhydride containing materials include maleic anhydride, citraconic anhydride, dimethyl maleic anhydride, chloro maleic anhydride, dichloro maleic anhydride, itaconic anhydride and mixtures thereof. The anhydride containing material can also be a polymeric material containing pendant anhydride groups. For example, such a material can be prepared by reacting an isocyanate functional material with a hydroxy ester of sorbic acid followed by a Diels Alder reaction with maleic anhydride to form pendant anhydride groups.

The copolymer of olefinically unsaturated material and anhydride containing material is typically prepared by first heating the alpha olefin. Then an initiator such as a peroxy or azo type which is capable of generating free radicals upon decomposition is added along with the anhydride containing material.

The copolymer as prepared is not soluble in water therefore it is necessary to at least partially neutralize or neutralize the material. The copolymer can be neutralized or water solubilized by basic materials such as alkali hydroxides, alkali carbonates, alkali acetates, ammonium hydroxide, ammonium carbonate, ammonium acetate, alkyl amines, alkyl, aromatic or cycloaliphatic amino alcohols.

Especially preferred are amino compounds such as ammonia, triethyl amine and dimethylethanolamine and they are typically used based on 1 equivalent of carboxy group to 0.8 to 1.5 equivalent of amine, preferably 1 to 1 equivalent.

It should be understood that as an alternative to the aforedescribed procedure, one can react the anhydride containing material with a functional acrylate or methacrylate to form a pendant reactive group as a graft site prior to dispersing the polyanhydride in a basic water solution.

In another embodiment which is considered to be within the scope of the present invention, one can prepare a base neutralized copolymer dispersant, e.g. 1-decene maleic anhydride copolymer dispersant neutralized with dimethylaminoethanolamine, and use this in the preparation of an "internally crosslinkable" latex.

This can be accomplished by adding a portion of tertiary-butyl aminoethyl methacrylate monomer to the vinyl monomer component. The latex can be applied and baked without the necessity for adding external crosslinking agent. The dimethylaminoethanolamine is liberated upon baking forming the anhydride and the tertiary-butyl aminoethyl methacrylate reacts to crosslink the system.

The copolymer of olefinically unsaturated material and anhydride containing material generally has a low peak molecular weight. That is the peak molecular weight generally does not exceed 50,000 and typically does not exceed 20,000. Usually the peak molecular weight of the copolymer ranges from about 3000 to about 15,000, preferably from about 4000 to about 12,000. The peak molecular weight is determined by Gel Permeation Chromatography (GPC) using a polystyrene standard.

The vinyl monomer component which is polymerized in the presence of the base neutralized copolymer described in detail above is a mixture of monomers which is capable of free radical initiated polymerization in an aqueous medium. The monomers in the mixture can be selected from a variety of materials including alkyl acrylates and methacrylates, vinyl esters of organic acids and alkyl esters of maleic and fumaric acid.

Among the alkyl acrylates and methacrylates which can be used are 1 to 18 carbon alkyl acrylates and methacrylates. Specific examples of suitable unsaturated monomers of this type include methyl methacrylate, butyl methacrylate, hexyl methacrylate, octyl methacrylate, isodecyl methacrylate, stearyl methacrylate, methyl acrylate, ethyl acrylate, butyl acrylate, hexyl acrylate, 2-ethyl hexyl acrylate, glycidyl acrylate, glycidyl methacrylate, dimethylaminoethyl methacrylate, octyl acrylate, decyl acrylate and dodecyl acrylate. Besides the alkyl esters of alpha,beta-ethylenically unsaturated carboxylic acids mentioned above, substituted esters, for example, hydroxy alkyl esters such as hydroxyethyl and hydroxypropyl acrylate and methacrylate can also be used. In a preferred embodiment at least a portion of the vinyl monomer component is an active hydrogen containing vinyl monomer such as the hydroxyl functional vinyl monomers mentioned above. These are particularly suitable for preparing stable emulsion polymers which can be utilized in formulating thermosetting coating compositions which can be crosslinked with a suitable crosslinking agent for the hydroxyl groups. Alternatively, with epoxy or amine functional groups present, suitable crosslinking agents for these functional groups may be utilized.

Examples of other unsaturated monomers are polyfunctional acrylates and methacrylates such as 1,6-hexanediol diacrylate or dimethacrylate, ethylene glycol diacrylate or dimethacrylate, trimethylolpropane triacrylate, 1,4-butanediol diacrylate, 1,4-butanediol dimethacrylate, pentaerythritol tetracrylate, pentaerythritol triacrylate, bisphenol A diacrylate, bisphenol A dimethacrylate, allyl methacrylate, N-alkoxy methyl acrylamides or methacrylamides such as N-ethoxy methyl and N-butyl methylol acrylamide and methacrylamide; vinyl aromatic compounds such as styrene, alpha-methyl styrene, alpha-chlorostyrene and vinyl toluene; vinyl chloride; vinylidene chloride; vinyl fluoride; vinylidene fluoride; vinyl esters such as vinyl acetate; organic nitriles such as acrylonitrile and methacrylonitrile; allyl monomers such as allyl chloride and allyl cyanide and monomeric dienes such as 1,3-butadiene and 2-methyl-1,3-butadiene.

With regard to the amount of the vinyl monomer component, it is usually used in amounts of from about 30 to about 95, preferably 70 to 90 percent by weight based on the total weight of vinyl monomer component and base neutralized copolymer.

With regard to the conditions to the polymerization, the vinyl monomer component is polymerized in aqueous medium with a free radical initiator and in the presence of the base neutralized copolymer of the olefinically unsaturated material described above and anhydride containing material described above. The temperature of polymerization is typically from about 40° C. to about 85° C., usually from about 60° C. to about 80° C. and the pH of the aqueous medium is usually maintained from about 5.5 to about 10. The base neutralized copolymer described above can either by pre-prepared and utilized in the polymerization or the base neutralized copolymer can be prepared in situ during the emulsion polymerization. Preferably, the copolymer is prepared prior to the polymerization.

The free radical initiator can be selected from one or more peroxides which are known to act as free radical initiators and which are soluble in aqueous medium. Examples include the persulfates such as ammonium, sodium and potassium persulfate. Also, oil-soluble initiators may be employed either alone or in addition to the water soluble initiators. Typical oil-soluble initiators include organic peroxides such as benzoyl peroxide, t-butyl hydroperoxide and t-butyl perbenzoate. Azo compounds such as azobisisobutyronitrile can also be used.

The polymerization may be conducted as batch, intermittent or a continuous operation. While all of the polymerization ingredients may be charged initially to the polymerization vessel, better results normally are obtained with proportioning techniques.

For polymerization of the vinyl monomer component in the presence of the base neutralized copolymer, the aqueous medium preferably should be present in amounts from about 20 to 80, more preferably 40 to 60 percent by weight based on total weight of the aqueous medium and base neutralized copolymer.

Besides water, the aqueous medium can contain some organic co-solvents. The organic co-solvents are preferably soluble or miscible with water. Examples of such solvents include oxygenated organic solvents such as mono alkyl ethers or ethylene glycol and diethylene glycol which contain from 1 to 4 carbon atoms in the alkyl group such as the mono ethyl and mono butyl ethers of ethylene glycol and diethylene glycol. Examples of other water soluble solvents include alcohols such as ethanol, isopropanol, butanol and diacetone alcohol. Preferably, the water soluble oxygenated organic solvents should be present in amounts less than 30 percent and more preferably less than 5 percent by weight based on the total weight of the aqueous medium.

Minor amounts, that is less than 5 percent by weight based on the total weight of the aqueous medium, of non polar, water immiscible solvents such as aliphatic, cycloaliphatic and aromatic hydrocarbons such as hexane and cyclohexane may also be used in the aqueous medium.

Typically, the reactor vessel is charged with an appropriate amount of aqueous medium, base neutralized copolymer and free radical initiator. The reactor is then heated to the free radical initiation temperature and charged with the vinyl monomer component. Preferably only aqueous medium, initiator and the base neutralized copolymer and part of the vinyl monomer component are initially charged to the reactor. After this initial charge (seed stage) has been allowed to react for a period of time, the remaining monomer component is added incrementally with the rate of addition being varied depending upon the polymerization temperature, the particular initiator employed and the type and amount of monomers being polymerized. After all of the vinyl monomer component has been charged, a final heating is usually done to complete the polymerization, the reactor is then cooled and the latex recovered. If desired, other techniques well known to those skilled in the art can be utilized such as core shell polymerization and grafting which has been described previously in this application. As was mentioned above, the emulsion polymer prepared according to the present invention is a stable polymer. By stable is meant that the dispersion will not gel, flocculate nor precipitate at a temperature of 25° C. for at least 12 months.

It should be understood that other conventional surfactants may be utilized in conjunction with the base neutralized copolymer. These materials are well understood by those skilled in the art, therefore they will not be discussed in detail.

The stable emulsion polymers of the present invention are useful in formulating coating compositions. The stable emulsion polymer may be utilized to prepare a thermoplastic coating composition simply by applying the emulsion polymer to a substrate and evaporating the aqueous medium either at ambient temperature or at elevated temperature for example, 25° C. to 300° C.

One preferred example of a thermoplastic coating composition is an air dry barrier coating composition which exhibits excellent adhesion to bare metals, a variety of primers and topcoats. The emulsion polymer for this application typically contains nitrile functionalized monomers (e.g., methacrylonitrile) in an amount up to 50 percent based on the total vinyl monomer component. This emulsion polymer is also prepared with butyl acrylate and methyl methacrylate in amounts sufficient to achieve uniform film formation. As is appreciated by those skilled in the art, the precise amounts can vary widely depending upon the particular solvent or solvents, plasticizers, pigments and other extenders as well as particular amounts used. The emulsion polymer also is prepared from N-methylolacrylamide monomer for crosslinking to provide hardness and adhesion to topcoats; and glycidyl methacrylate monomer. The glycidyl methacrylate monomer is preferably present in the seed stage of the vinyl polymerization to react with the acid groups on the decene maleic anhydride copolymer to provide a grafting site for the other vinyl monomers. This mode of polymerization generally results in improved physical properties, especially film hardness.

The stable emulsion polymers are also useful in formulating thermosetting coating compositions. As was mentioned above, it is desirable for this application to have at least a portion of the vinyl monomer component be hydroxyl functional in order to provide crosslinking sites in the polymer. The emulsion polymer can be combined with a suitable crosslinking agent, blocked polyisocyanate or aminoplast, and other suitable additives as desired. In one preferred embodiment the stable emulsion polymer is combined with other polymeric materials such as polyesters and polyurethanes which after crosslinking result in excellent coating films having good sag resistance and physical properties in addition to low volatile organic content.

One preferred example of such a thermosetting system is a topcoat composition prepared with an amount of butyl acrylate and methyl methacrylate sufficient to achieve uniform film formation. The amount of decene maleic anhydride copolymer typically ranges from about 8 percent to about 30 percent based on the weight of the vinyl monomer component in order to optimize sag resistance while maintaining other properties. Once again, glycidyl methacrylate monomer is used to provide graft sites on the decene maleic anhydride copolymer which helps improve overall properties and application characteristics of the system. Moreover, dimethylethanolamine is used as a neutralizing agent which is believed to assist in film coalesence of the system.

Furthermore, the emulsion polymer is prepared from a vinyl monomer component containing hydroxyl functional monomer which provides sites for crosslinking with conventional crosslinking agents which have been mentioned above.

The coating compositions can be clear or pigmented and when pigmented may be pigmented with any of the conventional materials available.

In addition, various additives such as fillers, plasticizers, waxes, antioxidants, ultraviolet light absorbers, defoamers, fungicides, flow control agents, surfactants and other formulating additives may be utilized if desired.

The coating compositions can be applied to a variety of substrates including wood, metal, glass, cloth, plastics and the like by any of a variety of application techniques including spray, dip, brush, roller or electrodeposition.

The stable emulsion polymers of the present invention result in coating compositions having excellent physical properties including good adhesion, water resistance, hardness, flexibility and durability.

The following examples illustrate the invention and are not meant to be limiting.

EXAMPLE I

Preparation of a Copolymer of Maleic Anhydride and 1-Decene

To a 5 liter 4-neck round bottom flask fitted with a constant take-off condenser, thermometer, and two addition funnels was added 1403.5 grams of 1-decene. The flask was blanketed with nitrogen, stirred and heated to 145° C. In one addition funnel 33.8 grams of 60% active t-amyl peracetate in odorless mineral spirits (Lupersol 555-M 60 from Lucidol Corporation) was mixed with 278.5 grams of butyl acetate and in a separate jar 27.8 grams of butyl acetate for a rinse was retained. In the other funnel a solution of 491.2 grams of maleic anhydride dissolved in 1228 grams of butyl acetate was placed and in a separate jar 37 grams of butyl acetate for a rinse was retained. The initiator was started ½ hour before the maleic solution and added over 3 hours followed by a rinse. The maleic anhydride solution was added over 2 hours followed by a rinse. During the addition the stirred mass in the pot was maintained at 145° C. and low boiling material was left to distill over. After the addition was complete the solution was stirred for 1 hour at 145° to 150° C. The temperature was then raised to 180° C. and volatile materials were distilled off. Finally at 180° C. a nitrogen sparge was done for 1 hour and the resultant polymer was poured into a pan and cooled. The solids of the polymer were 99.3% determined for one hour at 110° C.

EXAMPLE II

Water Solubilization of 1-Decene, Maleic Anhydride Copolymer

To a flask was added 684.4 grams of copolymer described in Example I along with 3996.9 grams of water. The mass was stirred and heated to 40° to 45° C. and 280.6 grams of concentrated ammonium hydroxide (Fisher Reagent A.C.S. 28% to 30% $NH_3$) was added over 1 hour. The solution was stirred and heated for 5 hours then the heat was removed and it was stirred for 12 hours at which time the solution was clear and all the resin was in solution.

EXAMPLE III

Reaction of 1-Decene, Maleic Anhydride Copolymer with T-Butyl Aminoethyl Methacrylate In a 3 liter round bottom flask fitted with a stirrer, azeotropic reflux condenser, thermometer and an addition funnel was added 720 grams of 1-decene maleic anhydride copolymer and 720 grams of butyl acetate. The solution was refluxed 1 hour and water removed. The t-butyl aminoethyl methacrylate (92.5 grams) was then added over 1 hour and on completion 20 grams of butyl acetate was added as a rinse. The solution was refluxed ½ hour and then fitted for vacuum stripping. The system was evacuated to 70 millimeters Hg and heated to 180° C. for 1 hour after which it was poured into a pan and left to cool. The solids were 96.5% determined at 110° C. for 1 hour.

EXAMPLE IV

Preparation of 1-Hexene and Maleic Anhydride Copolymer

To a 5 liter round bottom flask fitted with a stirrer, thermometer, condenser and a dropping funnel was added 1066.9 grams of 1-hexene and 159.6 grams of benzoyl peroxide (Lucidol 78 commercially available from Pennwalt Corporation). To the dropping funnel was added a solution of 622.4 grams of maleic anhydride and 1566.5 grams of butyl acetate. The system was blanketed with $N_2$ and refluxed 1 hour and the water was removed azeotropically. The maleic anhydride solution was added over 3 hours maintaining a reflux during the addition. After the addition was complete the solution was refluxed 1 hour and then heated to 180° C. with the removal of volatile distillate. At 180° C. with $N_2$ sparge was started and it was held for 1 hour at 180° C. with $N_2$ sparge. The resultant polymer was poured into a pan and cooled. The solids content was 96.1% determined at 110° C. for 1 hour.

EXAMPLE V

Preparation of 1-Octene and Maleic Anhydride Copolymer

To a 5 liter round bottom flask fitted with a stirrer, thermometer, condenser and two dropping funnels was added 1246 grams of 1-octene. The charge was blanketed with $N_2$ and heated to reflux (119° C.). The initiator solution was t-amyl peracetate 60% in odorless mineral spirits (Lupersol 555-M60 commercially available from Pennwalt Corporation) and the monomer solution was 545.1 grams of maleic anhydride dissolved in 1308.3 grams of butyl acetate. The initiator charge was started 10 minutes before the monomer and extended over two hours. The monomer charge was entered over 1 ½ hours. The system was then refluxed for 1 hour and then heated to 150° C. and distillate removed. The solution at 150° C. was put under vacuum from a water aspirator and the residual solvent and 1-octene were removed. The solids content was 98.5% determined at 110° C. for 1 hour.

EXAMPLE VI

Preparation of 1-Decene and Citraconic Anhydride Copolymer

To a 5 liter round bottom flask fitted with a stirrer, thermometer, condenser and two addition funnels was added 2520 grams of 1-decene. The charge was blanketed with $N_2$ and heated to 120° C. An initiator solution of 26.1 grams of t-butyl perbenzoate and 280 grams of 1-decene was prepared and entered into a dropping funnel, while 224 grams of citraconic anhydride was placed in the other funnel. The initiator solution was started 15 minutes before the citraconic anhydride and it was added over 2 hours. The citraconic anhydride was added over 1½ hours. At the end of the additions the solution was held at 120° C. for 1 hour, then it was heated to 180° C. with the subsequent removal of all solvent. At 180° C. it was held 1 hour with a $N_2$ sparge then it was cooled and poured out. The solids content was 98.4% determined at 110° C. for 1 hour.

EXAMPLE VII

Preparation of 1-Decene and 1-Octene with Maleic Anhydride Copolymer

To a liter 5 liter round bottom flask fitted with a stirrer, thermometer, condenser and two dropping funnels was added 700 grams of 1-decene and 560 grams of 1-octene. The system was blanketed with $N_2$ and brought to reflux. In one dropping funnel was added a solution of 491.2 grams maleic anhydride and 1228 grams of butyl acetate. In the other dropping funnel was added an initiator solution of t-amyl peracetate (60% in odorless mineral spirits Lupersol 555-M60) and 278.5 grams of butyl acetate. The initiator solution was started 30 minutes before the maleic anhydride solution and extended over 3 hours while the maleic anhydride solution was added over 2 hours while the solution in the flask was maintained at reflux. After the additions were complete the solution was refluxed for 1 hour then heated to 180° C. with the subsequent removal of distillate. At 180° C. a $N_2$ sparge was started and held for 1 hour at 180° C. after which the polymer was poured into a pan and cooled. The solids content was 98.3% determined at 110° C. for 1 hour.

PREPARATION OF EMULSION POLYMERS

Example A 1635.0 grams of distilled water, 280.0 grams of solid decene-maleic anhydride copolymer of Example I, above were added to a five liter flask equipped with a condenser, agitator, and a nitrogen inlet. To this slurry was added 114.8 grams of 28% aqueous ammonium hydroxide solution. After a nitrogen blanket was established this slurry was heated to 60° C. and the mixture was stirred for two hours. To the resulting solution 11.2 grams of tert-butyl aminoethyl methacrylate was added. Immediately thereafter a solution of 2.8 grams of sodium metabisulfite in 75.0 grams of deionized water and a solution of 2.8 grams of ammonium persulfate in 75.0 grams of deionized water were added separately to the reactor. The resulting mixture was stirred for 20 minutes. Then a monomer solution of 280.09 grams of methylmethacrylate, 705.6 grams of butyl acrylate, 67.2 grams of 2-hydroxy propylacrylate, and 56.0 grams of tert-butyl aminoethyl methacrylate was continuously added into the flask over a 4 hour period. Simultaneously a solution of 2.9 grams of sodium metabisulfite in 75.0 grams of deionized water and a solution of 2.8 grams of ammonium persulfate in 75.0 grams of deionized water were added separately to the reactor over the 4 hour period. After the coinitiator feeds and monomer feeds were added to the flask the reaction was stirred for two hours. The reaction was then cooled to 40° C. and a solution of 1.73 grams of Biochek 240 and 10.0 grams of deionized water were added. The mixture was then filtered through a 150 mesh screen with essentially no detectable grit being found. The resulting latex contained 40% solids and had a viscosity of 31 centipoise as determined by a Brookfield viscometer.

Example B 1651.6 grams of distilled water, 280.0 grams of solid decene-maleic anhydride copolymer of Example I were added to a five liter flask equipped with a condenser, agitator, and a nitrogen inlet. To this slurry was added 81.7 grams of dimethylethanolamine. After a nitrogen blanket was established this slurry was heated to 80° C. and the mixture was stirred for two hours. To the resulting solution 11.2 grams of glycidyl methacrylate was added. Immediately thereafter a solution of 3.0 grams of ammonium persulfate in 100.0 grams of deionized water was added to the reactor. The resulting mixture was stirred for 20 minutes. Then a monomer solution of 560.0 grams of methylmethacrylate, 470.4 grams of butyl acetate, 67.2 grams of hydroxyethyl acrylate, and 22.4 grams of N-metholacrylamide was continuously added into the flask over a 4 hour period. Simultaneously a solution of 2.6 grams of ammonium persulfate in 200.0 grams of deionized water was added to the reactor over the 4 hour period. After the initiator feed and monomer feed was added to the flask the reaction was stirred for two hours. The reaction was then cooled to 40° C. and filtered through a 150 mesh screen with essentially no detectable grit being found. The resulting latex contained 42% solids and had a viscosity of 84 centipoise as determined by a Brookfield viscometer.

Example C 3900.3 grams of distilled water, 616.0 grams of solid decene-maleic anhydride copolymer of Example I were added to a twelve liter flask equipped with a condenser, agitator, and a nitrogen inlet. To this slurry was added 179.7 grams of dimethylethanolamine. After a nitrogen blanket was established this slurry was heated to 80° C. and the mixture was stirred for two hours. To the resulting solution 24.6 grams of glycidyl methacrylate was added. Immediately thereafter a solution of 6.6 grams of ammonium persulfate in 100.0 grams of deionized water was added to the reactor. The resulting mixture was stirred for 20 minutes. Then a monomer solution of 1232.0 grams of methylmethacrylate, 1059.3 grams of butyl acrylate, 147.8 grams of hydroxyethyl acrylate was continuously added into the flask over a 4 hour period. Simultaneously a solution of 5.7 grams of ammonium persulfate in 440.0 grams of deionized water was added to the reactor over the 4 hour period. After the initiator feed and monomer feed was added to the flask the reaction was stirred for two hours. The reaction was then cooled to 40° C. and filtered through a 150 mesh screen with essentially no detectable grit being found. The resulting latex contained 42% solids and has a viscosity of 38 centipoise as determined by a Brookfield viscometer.

Example D 1635.0 grams of distilled water, 280.0 grams of solid decene-maleic anhydride copolymer of Example I were added to a five liter flask equipped with a condenser, agitator, and a nitrogen inlet. To this slurry was added 114.8 grams of 28% aqueous ammonium hydroxide solution. After a nitrogen blanket was established this slurry was heated to 60° C. and the mixture was stirred for two hours. To the resulting solution 11.2 grams of glycidyl methacrylate was added. Immediately thereafter a solution of 3.35 grams of sodium metabisulfite in 75.0 grams of deionized water and a solution of 3.35 grams of ammonium persulfate in 75.0 grams of deionized water were added separately to the reactor. The resulting mixture was stirred for 20 minutes. Then a monomer solution of 422.8 grams of methylmethacrylate, 560.0 grams of butyl acetate, 56.0 grams of hydroxyethyl acrylate, 56.0 grams of methacrylonitrile and 28.0 grams of N-methyolacrylamide was continuously added into the flask over a 4 hour period. Simultaneously a solution of 3.35 grams of sodium metabisulfite in 75.0 grams of deionized water and a solution of 3.35 grams of ammonium persulfate in 75.0 grams of deionized water were added separately to the reactor over the 4 hour period. After the coinitiator feeds and monomer feeds were added to the flask the reaction was stirred for two hours. The reaction was then cooled to 40° C. and filtered through a 150 mesh screen with essentially no detectable grit being found. The resulting latex contained 41% solids and had a viscosity of 25 centipoise as determined by a Brookfield viscometer.

Example E 926.5 grams of distilled water, 181.0 grams of solid hexene-maleic anhydride copolymer of Example IV were added to a three liter flask equipped with a condenser, agitator, and a nitrogen inlet. To this slurry was added 26.5 grams of 28% aqueous ammonium hydroxide solution. After a nitrogen blanket was established this slurry was heated to 60° C. and the mixture was stirred for two hours. To the resulting solution 7.2 grams of glycidyl methacrylate was added. Immediately thereafter a solution of 1.8 grams of sodium metabisulfite in 100.0 grams of deionized water and a solution of 1.8 grams of ammonium persulfate in 100.0 grams of deionized water were added separately to the reactor. The resulting mixture was stirred for 20 minutes. Then a monomer solution of 362.2 grams of methylmethacrylate, 326.0 grams of butyl acetate, and 36.2 grams of hydroxyethyl acrylate was continuously added into the flask over a 4 hour period. Simultaneously a solution of 1.8 grams of sodium metabisulfite in 100.0 grams of deionized water and solution of 1.8 grams of ammonium persulfate in 100.0 grams of deionized water were added separately to the reactor over the 4 hour period. After the coinitiator feeds and monomer feeds were added to the flask the reaction was stirred for two hours. The reaction was then cooled to 40° C. and filtered through a 150 mesh screen with essentially no detectable grit being found. The resulting latex contained 41% solids and had a viscosity of 2070 centipoise as determined by a Brookfield viscometer.

Example F 992.2 grams of distilled water, 181.8 grams of solid 1-decene citraconic anhydride copolymer of Example VI were added to a three liter flask equipped with a condenser, agitator, and a nitrogen inlet. To this slurry was added 19.2 grams of 28% aqueous ammonium hydroxide solution. After a nitrogen blanket was established this slurry was heated to 60° C. and the mixture was stirred for two hours. To the resulting solution 7.3 grams of glycidyl methacrylate was added. Immediately thereafter a solution of 1.8 grams of sodium metabisulfite in 100.0 grams of deionized water and a solution of 1.8 grams of ammonium persulfate in 100.0 grams of deionized water were added separately to the reactor. The resulting mixture was stirred for 20 minutes. Then a monomer solution of 363.6 grams of methylmethacrylate, 327.3 grams of butyl acrylate, and 36.4 grams of hydroxyethyl acrylate was continuously added into the flask over a 4 hour period. Simultaneously a solution of 1.8 grams of sodium metabisulfite in 100.0 grams of deionized water and a solution of 1.8 grams of ammonium persulfate in 100.0 grams of deionized water were added separately to the reactor over the 4 hour period. After the coinitiator feeds and monomer feeds were added to the flask the reaction was stirred for two hours. The reaction was then cooled to 40° C. and filtered through a 150 mesh screen with less than 1% by weight grit being found. The resulting latex contained 37% solids and had a viscosity of 16 centipoise as determined by a Brookfield viscometer.

Example G 261.0 grams of 1-decene were added to a five liter flask equipped with a condenser, agitator, and a nitrogen inlet. The solution of 1-decene was heated to 145° C. To this heated solution was continuously added over a two hour period a mixture containing 8.23 grams of Lupersol 555-M60 initiator and 53.6 grams of 1-decene. Ten minutes after the start of the initiator feed a solution containing 121.0 grams of maleic anhydride and 309.2 grams of butyl acetate was added continuously over one and half hours while maintaining the reaction temperature at 145° C. After the solution containing the maleic anhydride was completely added the reaction temperature was maintained at 145° C. for thirty minutes. The reaction was cooled to room temperature and a vacuum distillation was undertaken using a standard setup. The solvent and residual monomers were removed by vacuum distillation until 155° C. and less than or equal to 70 millimeters of mercury were obtained. Vacuum distillation was continued for an additional hour until no more solvent was being removed as determined by visual inspection of the distillation condenser. 17.16.4 grams of distilled water and 120.5 grams of 28% aqueous ammonium hydroxide solution were added to this five liter flask which now was equipped with a condenser, agitator, and a nitrogen inlet. After a nitrogen blanket was established this slurry was heated to 60° C. and the mixture was stirred for two hours. To the resulting solution 11.2 grams of tert-butyl aminoethyl methacrylate was added. Immediately thereafter a solution of 2.8 grams of sodium metabisulfite in 75.0 grams of deionized water and a solution of 2.8 grams of ammonium persulfate in 75.0 grams of deionized water were added separately to the reactor. The resulting mixture was stirred for 20 minutes. Then a monomer solution of 280.0 grams of methylmethacrylate, 705.6 grams of butyl acrylate, 67.2 grams of 2-hydroxypropyl acrylate, and 56.0 grams of tert-butyl aminoethyl methacrylate was continuously added into the flask over a 4 hour period. Simultaneously a solution of 2.8 grams of sodium metabisulfite in 75.0 grams of deionized water and a solution of 2.8 grams of ammonium persulfate in 75.0 grams of deionized water were added separately to the reactor over the 4 hour period. After the coinitiator feeds and monomer feeds were added to the flask the reaction was stirred for two hours. The reaction was then cooled to 40° C. and a solution of 1.73 grams of Biocheck 240 and 10.0 grams of deionized water were added. The mixture was then filtered through a 150 mesh screen with essentially no detectable grit being found. The resulting latex contained 40% solids and had a viscosity of 33 centipoise as determined by a Brookfield viscometer.

Example H 1700.0 grams of distilled water, 280.0 grams of solid 1-octene anhydride copolymer of Example V were added to a five liter flask equipped with a condenser, agitator, and a nitrogen inlet. To this slurry was added 128.1 grams of 28% aqueous ammonium hydroxide solution. After a nitrogen blanket was established this slurry was heated to 60° C. and the mixture was stirred for two hours. To the resulting solution 11.2 grams of glycidyl methacrylate was added. Immediately thereafter a solution of 2.6 grams of sodium metabisulfite in 75.0 grams of deionized water and a solution of 2.6 grams of ammonium persulfate in 75.0 grams of deionized water were added separately to the reactor. The resulting mixture was stirred for 20 minutes. Then a monomer solution of 560.0 grams of methylmethacrylate, 481.0 grams of butyl acrylate, and 67.2 grams of hydroxypropyl acrylate was continuously added into the flask over a 4 hour period. Simultaneously a solution of 2.6 grams of sodium metabisulfite in 75.0 grams of deionized water and a solution of 2.6 grams of ammonium persulfate in 750.0 grams of deionized water were added separately to the reactor over the 4 hour period. After the coinitiator feeds and monomer feeds were added to the flask the reaction was stirred for two hours. The reaction was then cooled to 40° C. and filtered through a 150 mesh screen with no detectable grit being found. The resulting latex contained 41% solids and had a viscosity of 21 centipoise as determined by a Brookfield viscometer.

Example J

Acrylic Latex Made With T-Butyl Aminoethyl Methacrylate Modified Copolymer of 1-Decene and Maleic Anhydride To a 5 liter round bottom flask fitted with a stirrer, thermometer, condenser and dropping funnels was added 280 grams of 1-decene, maleic anhydride copolymer (Example I) and 400 grams of butyl acetate. The solution was stirred at 25°-30° C. for 1 hour then 11.1 grams of t-butyl aminoethyl methacrylate in 75 grams of butyl acetate was added over ½ hour. This solution was stirred 10-15 minutes then heated to 150° C. with the subsequent removal of solvent. At 150° C. a vacuum from a water aspirator was applied to the system to remove residual solvent and the polymer was held at 150° C. under vacuum for 1 hour then cooled under vacuum to 100° C. at which point the vacuum was removed by N₂ bleed and 1580 grams of deionized water was added rapidly. To the water polymer mixture was added 178 grams of dimethylethanolamine over ½ hour. The solution was warmed to 90° C. and stirred until the polymer was in solution. The temperature was lowered to 60° C. and the stirrer speed was adjusted to 300 rpm. To this was added rapidly in succession (a) ammonium persulfate 2.8 grams in water 75 grams (b) sodium metabisulfite 2.8 grams in water 75 grams and (c) a mixture of monomers 5.6 grams of methylmethacrylate, 4.8 grams of butyl acrylate and 6.7 grams of hydroxyethyl acrylate. This was stirred 20 minutes at 60° C. and then the following solutions were made and added in the following manner.

A. Solution
  2.8 grams of ammonium persulfate
  480 grams of water
B. Solution
  2.8 grams of sodium metabisulfite
  480 grams of water
C. Solution
  554 grams of methylmethacrylate
  476.2 grams of butyl acrylate
  60.5 grams of hydroxyethyl acrylate The stirring was maintained at 300 rpm and the temperature was 60° C. during the additions. Solution A was started 10 minutes before Solution B and Solution A was added over 4 hours. Solution B was started 10 minutes before Solution C and Solution B was added over 4 hours. Solution C was added over 3½ hours. When the solutions were all added the system was held 2 hours at 60° C. then left to cool under agitation to 25°-30° C. The latex was poured and the solids were 31.6% at 110° C. for 1 hour. The Brookfield viscosity with a #1 spindle at 60 rpm was 7.01 centipoise.

Example K

Internally Crosslinkable Latex

To a 5 liter round bottom flask equipped with a stirrer, thermometer, condenser and addition funnels was added 280 grams of 1-decene maleic anhydride copolymer prepared according to the procedure detailed in Example I, 1600 grams deionized water and 178 grams of dimethylaminoethanolamine. The anhydride polymer was solubilized and at 45° C. 3 ppm of ferrous ammonium sulfate was added followed immediately by a solution of 2.8 grams of ammonium persulfate in 20 grams of water, 2,8 grams of sodium metabisulfite in 20 grams water and a mixture of 5.5 grams of methylmethacrylate, 9.3 grams of t-butyl aminoethyl methacrylate and 4.6 grams of butyl acrylate. After 20 minutes at 45° C. the following were added in order, 2.8 grams of ammonium persulfate in 480 grams of water this was added over 4 hours and started 10 minutes before a solution of 2.8 grams of sodium metabisulfite which was added over 4 hours and stated 10 minutes before a mixture of 548.4 grams of methylmethyacrylate, 456 grams of butyl acrylate and 83 grams of t-butyl aminoethyl methacrylate which was added over 3½ hours. When the additions were complete the latex was held 2 hours at 45° C. and then poured. Solids were at 110° C. for 1 hour. The Brookfield viscosity with a #1 spindle at 60 rpm was 10.5 centipoise.

Films of the latex were cast using a stationary 3 milliliter delivery drawbar and the films were left to flash 3 hours. Individual films on Aluminum Panels were baked at 110° C., 130° C. and 150° C. for 15 and 30 minutes respectively. A control was an air dry film on aluminum which was left for 18 hours before subjecting it to testing. Testing was done by saturating a rag with the solvent and rapidly rubbing the panel until failure occurred or 50 double rubs were executed.

| Solvent | Water | | Ethyl Alcohol | |
|---|---|---|---|---|
| Time | 15 minutes | 30 minutes | 15 minutes | 30 minutes |
| Temperature | | | | |
| 110° C. | 50 rubs | 50 rubs | 20 rubs | 34 rubs |
| 130° C. | 50 rubs | 50 rubs | 38 rubs | 43 rubs |
| 150° C. | 50 rubs | 50 rubs | 38 rubs | 45 rubs |
| control | 25 rubs film failure | | 12 rubs film failure | |
| Solvent | Acetone | | Butyl Acetate | |
| Time | 15 minutes | 30 minutes | 15 minutes | 30 minutes |
| Temperature | | | | |
| 110° C. | 7 rubs | 10 rubs | 18 rubs | 20 rubs |
| 130° C. | 10 rubs | 13 rubs | 26 rubs | 28 rubs |
| 150° C. | 12 rubs | 20 rubs | 30 rubs | 39 rubs |
| control | 7 rubs film failure | | 12 rubs film failure | |

Example L

To a five liter flask equipped with a condenser, agitator, and a nitrogen inlet were added 1628.0 grams of distilled water, 280.0 grams of solid 50% octene 50% decene-maleic anhydride copolymer of Example VII. To this slurry was added 121.5 grams of 28% aqueous ammonium hydroxide solution. After a nitrogen blanket was established this slurry was heated to 60° C. and the mixture was stirred for two hours. To the resulting solution 11.2 grams of glycidyl methacrylate was added. Immediately thereafter a solution of 2.8 grams of sodium metabisulfite in 75.0 grams of deionized water and a solution of 2.8 grams of ammonium persulfate in 75.0 grams of deionized water were added separately to the reactor. The resulting mixture was stirred for 20 minutes. Then a monomer solution of 560.0 grams of methylmethacrylate, 481.0 grams of butyl acrylate, and 67.2 grams of 2-hydroxy propylacrylate was continuously added into the flask over a 4 hour period. Simultaneously a solution of 2.8 grams of sodium metabisulfite in 75.0 grams of deionized water and a solution of 2.8 grams of ammonium persulfate in 75.0 grams of deionized water were added separately to the reactor over the 4 hour period. After the coinitiator feeds and monomer feeds were added to the flask the reaction was stirred for 2 hours. The reaction was then cooled to 40° C. the mixture was then filtered through a 150 mesh screen with essentially no detectable grit being found. The resulting latex contained 42% solids and had a viscosity of 19 centipoise as determined by a Brookfield viscometer.

PREPARATION AND EVALUATION OF COATING COMPOSITIONS USING THE LATEX POLYMERS PREPARED IN EXAMPLES ABOVE

Example 1

Air Dry Barrier Coating

| Ingredients | Parts by Weight (grams) |
|---|---|
| Deionized water | 43.43 |
| L-475 defoamer[1] | 1.80 |
| TAMOL 850 surfactant[2] | 5.99 |
| STRODEX SEK-50 surfactant[3] | 4.20 |

| Ingredients | Parts by Weight (grams) |
|---|---|
| fumed silica | 5.87 |
| magnesium silicate | 71.51 |
| deionized water | 48.67 |
| Latex of Example D, above | 735.79 |

[1] This defoamer was available from Dow Corning.
[2] This surfactant was available from Rohm and Haas.
[3] This surfactant was available from Dexter Chemical Company.

The coating composition was prepared by initially preparing a paste by adding the ingredients in order, except for the latex, under cowls agitation, and continuing cowls action for approximately one hour. The paste was then let down with the latex and any of the deionized water remaining which was not required in the grinding process.

The coating composition was evaluated in the following manner. The composition was spray applied at a pressure of 35 to 40 pounds per square inch over two substrates. Prior to coating, the first substrate was prepared to simulate an original equipment finish in the following manner. Twenty-four gauge cold rolled steel panels treated with BONDERITE 40 and primed with E 5627 primer surface from PPG Industries, Inc. PPG FINISHES, reduced to 20-22 seconds Ford Cup viscosity with butyl acetate. The primer surface was sprayed at a thickness of 1.0 mil and baked at 325° F. for 30 minutes. The surface was sanded and the original equipment lacquer WALM 848 available from PPG Industries, Inc. was reduced to 80 percent by volume with a blend of 70 percent ethylene glycol monobutyl ether and 30 percent mineral spirits. The lacquer was spray applied at 2.0 mils dry film thickness. The film was baked for 20 minutes at 230° F. followed by 30 minutes at 330° F. This substrate was then sanded on one-half and left intact on the other half. Prior to coating, the second substrate was prepared to simulate a refinish basecoat/clearcoat finish. Twenty-four gauge cold rolled steel treated with BONDERITE 40 was primed with DP 40-401, a two component epoxy primer from PPG Industries, Inc. PPG FINISHES, base coated with DDL 2058 Acrylic Lacquer from PPG Industries, Inc., PPG FINISHES and clear coated with DAU-75 urethane clearcoat from PPG Industries, Inc., PPG FINISHES. This finish was then sanded in one thin line to expose the primer and feather edge which is sensitive to being recoated with other refinish coating systems.

The barrier coating composition was applied with two double coats, that is, one coat was spray applied and flashed for 5 minutes followed by a second coat which was (dry film thickness of both coats was 2 mils) allowed to flash dry at ambient temperature for one hour. Refinish lacquer, DDL 9300 acrylic lacquer which was reduced with DTL-105 thinner to 150 percent by volume was then applied. The barrier coat properties were good if the solvents were prevented from reaching the substrate and lifting the topcoat.

Twenty-four hours after recoat, the panels were evaluated for repair. At this time, cross-hatch adhesion was also tested over all substrates. Crosshatch adhesion was determined according to ASTM D 3359-83. Repair was evaluated as follows. The substrates were scuff sanded mechanically with 320 grit sandpaper and a repair was sanded vertically down the center of the panel, exposing the edges of basecoat and the clearcoat. The substrates were washed with water, dried and wiped clean with Aliphatic solvent. Primer was then applied with two double coats, allowed to flash dry at ambient temperature for one hour and solvent reduced refinish lacquer was applied. The panels were evaluated.

After a minimum of four days of air dry time, the system was tested for humidity exposure. Humidity exposure was in a humidity cabinet at 100° F. ad 100 percent relative humidity.

The results are tabulated below:

| Substrate | Barrier coat dry film thickness | Lacquer topcoat dry film thickness | 24 hour topcoat appearance after repair | 24 hour adhesion | 4 day humidity adhesion | 72 hour recoat adhesion |
|---|---|---|---|---|---|---|
| Simulated Refinish | 1.5 | 1.7 | Slight lift | Good | Good | Good |
| Simulated OEM | 1.5 | 1.7 | Good | Good Good* | Fail Fail* | Good Good* |

*The rating in numerator is over sanded substrate while the rating in the denominator is over unsanded substrate.

Example 2

Air Dry Underbody Coating

| Ingredients | Parts by Weight (grams) |
|---|---|
| Latex of Example A, above | 24.4 |
| POLYSAR 404 latex[4] | 8.1 |
| Dolomite pigment | 36.2 |
| Lampblack pigment | 0.9 |
| mica | 7.2 |
| PLUS Spheres 150[5] | 18.1 |
| deionized water | 4.5 |
| aminomethylpropanol | 0.5 |

[4] This styrene butadiene latex was commercially available from BASF.
[5] This pigment was commercially available from PlussStaufer Int.

The coating composition was prepared by mixing the ingredients together at high speed with a propeller blade for 3 to 5 minutes.

The viscosity of the final mix was determined on an RVF Brookfield viscometer at 75° F. with a number 4 spindle. The values were 50,000 centipoise at 2 RPM and 15,000 centipoise at 20 RPM. The index of 3.3 indicated sufficient sag resistance after spray application for use on automotive underbodies.

Gravel resistance of the air dried (overnight, room temperature, 40-50% relative humidity) coating was evaluated according to the GM Gravelometer Test: 5 pints of ¼"-182" road gravel, blown with 70 psi air pressure at a 4"×12" panel painted with PPG topcoat (UBC 8554 basecoat+UBC 1000 topcoat, 30 min/250° F. bake) and then coated with various thicknesses of the above coating. The panel was equilibrated at −10° F. for 1 hour prior to testing. The tested panels are rate, 0:

very poor to 10: excellent. The following results were obtained for the above coating.

| Coating thickness (mils) | Gravelometer Rating |
|---|---|
| 20 | 6.5 |
| 40 | 10 |
| 80 | 10 |

Example 3

Thermosetting Topcoat Composition

| Ingredients | Parts by Weight (grams) |
|---|---|
| Latex of Example C, above | 182.0 |
| dimethylethanolamine | 6.8 |
| CYMEL 303 | 16.0 |
| AEROSOL-OT-75 | 0.28 |
| SURFYNOL 104-PA[16] | 2.1 |
| Dispersing Agent[17] | 3.5 |
| titanium dioxide paste[18] | 153.7 |
| sodium benzoate | 5.2 |
| trimethylolpropane | 5.2 |

[16] This surfactant was commercially available from Air Products.
[17] This dispersing agent was a copolymer of 87% butyl acrylate and 13% acrylic acid. This agent was prepared at 60.5% solids in a 53.9% butyl cellosolve, 40.8% butanol, and 5.3% deionized water solvent blend. An initial charge of 63.6 grams of butyl cellosolve and 7.8 grams of deionized water were heated to reflux. Once the initial charge was at reflux the monomer mixture of 208.3 grams of butyl acrylate and 31.0 grams of acrylic acid was added over 3 hours while maintaining reflu x. Concurrently an initiator feed containing 6.3 grams of butyl cellosolve and 4.8 grams of t-butyl peroxyacetate was also added. After the two feeds were completed 6.4 grams of butyl cellosolve were added.
The reaction was maintained at reflux for one hour. Then a feed containing 8.2 grams of butyl cellosolve and 0.6 grams of t-butyl peroxyacetate was added over 30 minutes. The reaction was held at reflux for 1 hour. Then 40.0 grams of butanol was added over 5 minutes and the reaction mixture was allowed to cool to room temperature. This yielded an acrylic polymer solution that was 60.5% solids that had a viscosity of 4000 centipoise as measured on a Brookfield viscometer.
[18] This pigment paste was commercially available from Cardinal Color.
The coating composition was prepared by combining the ingredients with agitation. The coating was spray applied to a cold rolled steel substrate treated with BOND-ERITE 1000 which is an iron phosphate pretreatment at 95 percent relative humidity and 72° F. and baked for 15 minutes at 300° F. The film exhibited the following physical properties:

Dry film thickness: 1.0 to 1.5 mils
Pencil Hardness: F
Pencil hardness was a measure of the resistance of the coating to a pencil indentor. The hardness scale is as follows: 5B, B4, 3B, B2, B, HB, H, 2 H, 3H, 4H, 5H— etc.
An increasing "H" value indicates a harder coating with more resistance to a pencil indentor while increasing "B" values indicates a softer coating with less resistance to a pencil indentor.
Methyl Ethyl Ketone double rubs: 15
This indicated the solvent resistance of the coating to a cloth saturated in the solvent and rubbed on the film until the substrate was exposed.
Direct/Reverse Impact—greater than 30/greater than 30 inch pounds. This was determined according to ASTM-D-2794-84.
Cross-hatch Adhesion—Excellent. This was determined according to ASTM-D-3359-83.
Salt Spray (5%), 144 hours—(Pass). This was determined according to ASTM-B-117-73.
Humidity (100%/100° F.): 1000 hours—(Pass) This was determined according to ASTM D-2247-68 and D-714-56.
60° Gloss=70 This was determined according to ASTM D-523-80.

What is claimed is:
1. A stable emulsion polymer prepared by the emulsion polymerization of a vinyl monomer component in the presence of an at least partially base neutralized copolymer having a peak molecular weight not exceeding 50,000 of an olefinically unsaturated material selected from the group consisting of 1-decene, 1-dodecene, undecenylic acid and mixtures thereof and an ethylenically unsaturated anhydride containing material.

2. The emulsion polymer of claim 1 wherein the vinyl monomer component comprises an alkyl acrylate or methacrylate.

3. The emulsion polymer of claim 1 wherein the vinyl monomer component comprises vinyl chloride, vinylidene chloride, vinyl fluoride, vinylidene fluoride, acrylonitrile or methacrylonitrile.

4. The emulsion polymer of claim 1 wherein the vinyl monomer component comprises at least a portion of an active hydrogen containing vinyl monomer.

5. The emulsion polymer of claim 4 wherein the active hydrogen containing vinyl monomer is a hydroxyl functional vinyl monomer.

6. The emulsion polymer of claim 4 wherein the active hydrogen containing vinyl monomer is an amine functional vinyl monomer.

7. The emulsion polymer of claim 4 wherein the active hydrogen containing vinyl monomer is an epoxy functional vinyl monomer.

8. The emulsion polymer of claim 4 wherein the active hydrogen containing vinyl monomer is a carboxyl functional vinyl monomer.

9. The emulsion polymer of claim 1 wherein the anhydride containing material is selected from the group consisting of maleic anhydride, citraconic anhydride, dimethyl maleic anhydride, chloromaleic anhydride, dichloromaleic anhydride, itaconic anhydride and mixtures thereof.

10. The emulsion polymer of claim 1 wherein the vinyl monomer component contains glycidyl methacrylate in the seed stage of the polymer during the vinyl polymerization.

11. The emulsion polymer of claim 1 wherein the vinyl monomer component contains tertiary-butyl aminoethyl methacrylate in the seed stage of the polymer during vinyl addition polymerization.

12. The emulsion polymer of claim 1 wherein the vinyl monomer component contains a portion of polyfunctional acrylate or methacrylate monomer.

13. A thermoplastic coating composition, comprising a stable emulsion polymer prepared by the emulsion polymerization of a vinyl monomer component in the presence of an at least partially base neutralized copolymer having a peak molecular weight not exceeding 50,000 of an olefinically unsaturated material selected from the group consisting of 1-decene, 1-dodecene, undecenylic acid and mixtures thereof and an ethylenically unsaturated anhydride containing material.

14. The coating composition of claim 13 wherein the vinyl monomer component contains a portion of N-methylolacrylamide monomer.

15. The coating composition of claim 14 wherein the vinyl monomer component contains glycidyl methacrylate monomer in the seed stage of the polymer during the vinyl polymerization.

16. The coating composition of claim 15 wherein the copolymer dispersant is prepared from 1-decene and maleic anhydride.

17. A thermosetting coating composition comprising:
(a) a stable active hydrogen containing polymer prepared by the emulsion polymerization of a vinyl monomer component comprising at least a portion of an active hydrogen containing vinyl monomer, in the presence of an at least partially base neutralized copolymer having a peak molecular weight not exceeding 50,000 of an olefinically unsaturated material selected from the group consisting of 1-decene, 1-dodecene, undecenylic acid and mixtures thereof and an ethylenically unsaturated anhydride containing material; and (b) crosslinking agent adapted to crosslink with the active hydrogens on the emulsion polymer.

18. The coating composition of claim 17 wherein the at least partially base neutralized copolymer is prepared from 1-decene and maleic anhydride.

19. The coating composition of claim 18 wherein the vinyl monomer component contains glycidyl methacrylate in the seed stage of the vinyl polymer during vinyl polymerization.

20. The coating composition of claim 19 wherein an amine is used as the neutralizing agent for the copolymer.

* * * * *